(12) United States Patent
Sethi et al.

(10) Patent No.: US 7,166,728 B2
(45) Date of Patent: Jan. 23, 2007

(54) PROCESS FOR PREPARATION OF NEROL OXIDE

(75) Inventors: Vijay Kumar Sethi, Jammu (IN); Samar Singh Andotra, Jammu (IN); Subhash Chandra Taneja, Jammu (IN); Pankaj Gupta, Jammu (IN); Ghulam Nabi Qazi, Jammu (IN)

(73) Assignee: Council of Scientific and Industrial Research (IN)

( * ) Notice: Subject to any disclaimer, the term of this patent is extended or adjusted under 35 U.S.C. 154(b) by 245 days.

(21) Appl. No.: 11/023,904

(22) Filed: Dec. 28, 2004

(65) Prior Publication Data

US 2006/0142450 A1    Jun. 29, 2006

(51) Int. Cl.
*C07D 309/18*    (2006.01)

(52) U.S. Cl. .................................................. 549/356
(58) Field of Classification Search ................ 549/356
See application file for complete search history.

(56) References Cited

OTHER PUBLICATIONS

Bonino et al., Food Chem. (2002), vol. 80(1), pp. 125-133.*
Choi et al., Food Sci. and Biotech. (2002), vol. 11(1), pp. 71-77.*

* cited by examiner

*Primary Examiner*—Taofiq Solola
(74) *Attorney, Agent, or Firm*—Ostrolenk, Faber, Gerb & Soffen, LLP

(57) ABSTRACT

The present invention relates to a process for the synthesis of racemic nerol oxide i.e. 3,6-dihydro-4-methyl-2-[2-methyl-1-propenyl)-2H-pyran from monoterpene alcohol nerol i.e. cis-3,7-dimethylocta-2,6-diene-1-ol.

18 Claims, No Drawings

PROCESS FOR PREPARATION OF NEROL OXIDE

FIELD OF THE INVENTION

The present invention relates to a process for the synthesis of racemic nerol oxide i.e. 3,6-dihydro-4-methyl-2-[2-methyl-1-propenyl)-2H-pyran from monoterpene alcohol nerol i.e. cis-3,7-dimethylocta-2,6-diene-1-ol. The present invention particularly relates to a process for the preparation of racemic nerol oxide of formula 1 from nerol of formula 2 comprising addition of a halogenating agent to monoterpene nerol of formula 2 in an anhydrous alcoholic solvent to produce 7-alkoxy-3,7-dimethyl-6-halo-2-octenol of formula 3 where R represents the alkyl group such as methyl, ethyl, n-propyl and n-butyl and the like and X represents a halogen such as chloro, bromo-, iodo, thereafter dehydrohalogenation of the compound of formula 3 with a strong base or an alkali furnishing 7-alkoxy-3,7-dimethyl-octa-2,5-dien-1-ol derivative of formula 4 and finally converting the octadienol of formula 4 to produce racemic nerol oxide of formula 1 using dilute mineral acid, Lewis acid or an acidic resin.

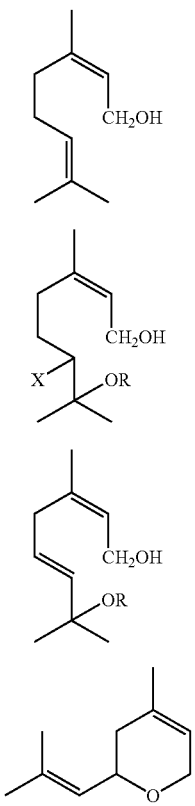

X = Cl, Br, I ; R = $CH_3$, $C_2H_5$, $C_3H_7$ etc.

BACKGROUND OF THE INVENTION

Nerol oxide is a valuable base material in perfumery and occur naturally as an ingredient of Bulgarian rose oil (0.038%) and grape juice. It exists naturally as a racemic mixture of (R and S) isomers of 3,6-dihydro-4-methyl-2-(2-methyl-1-propenyl)-2H pyran. The olfactory properties of racemic nerol oxide are comparable to those of diastereoisomeric rose oxides as regards totality and strength and is dominated by a powerful greenish-spicy note of the geranium type corresponding to the odour of (–)-cis-rose oxide.

Nerol and geraniol are the monoterpenic constituents of Cymbopogon spp. (lemon grass) These are the geometrical (cis and trans) isomers and can also be easily obtained by chemical reduction or catalytic hydrogenation of citral, another very common monoterpenic constituent of lemon grass.

Ohloff prepared the intermediate 3,7-dimethyl-octa-2,5-dien-1,7-diol from nerol by its photosensitized air oxidation followed by reduction and cyclisation with an acid to obtain racemic nerol oxide [G. Ohloff, K. H. Schulte-Elite & B. Willhalm Helv. Chim. Acta. 47, 602, 1964]. In another publication nerol was first subjected to epoxidation at $C_6$–$C_7$ double bond and the epoxy derivative so obtained was heated in dimethyl amine at 150° to give 3,7-dimethyl-6-dimethyl amino-2-octen-1,7-diol which on oxidation with hydrogen peroxide and pyrolysis at 180° C. gave a diol intermediate that on acid catalysed cyclisation led to the formation of nerol oxide [G. Ohloff & B. Lienhard Helv. Chim. Acta. 48, 182, 1965].

Tyman and Willis reported the total synthesis of nerol oxide by reaction of 3-methyl-2-butenal and 3-methyl-3-butenol in presence of an acid. [J. H. P. Tyman & B. J. Willis Tet. Lett. 4507, 1970]. Hasegawa T. Co Ltd. Japan in 1980 disclosed that 3,7-diethyl-1-octen-3-ol-5-one on reduction with Lithium aluminium hydride (LAH) followed by its cyclisation producing nerol oxide [Hasegawa T. Co Ltd. Japan, Chem. Abstracts, 93, 239702, 1980].

In another publication Ohloff et al. in 1980 described the synthesis of optically active nerol oxide from (–)-(R)-linalool in a nine step reaction sequence which is more of academic interest [G. Obloff, W. Giersch, K. M. Schulte-Elite, P. Enggist & E. Demole Helv. Chim. Acta. 63, 1582, 1980]. Thus the methodologies or processes reported in prior art are generally are of academic interest, non-ecnomical as well as cumbersome. The overall yield of the final product nerol oxide is also low.

OBJECTS OF THE INVENTION

The main objective of the present invention is to develop a novel, simple and economically viable process for the preparation of racemic nerol oxide.

Another objective of the invention is to develop a process from commercially available monoterpene alcohol nerol utilizng the cheap and recoverable reagents in the process that may be capable of facile up scaling.

SUMMARY OF THE INVENTION

Accordingly, the present invention provides a process for the preparation of racemic nerol oxide of formula 1 from monoterpene nerol of formula 2, the process comprising:

1

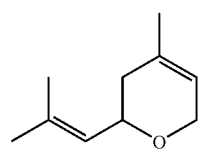

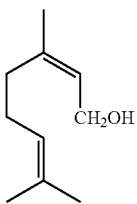

(i) haloalkoxylating monoterpene nerol of formula 2 with a halogenating agent and in a solvent to produce 7-alkoxy-3,7-dimethyl-6-halo-2-octenol of formula 3 where R is alkyl and X is halo;

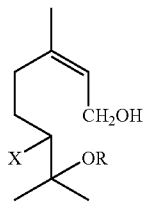

(ii) dehydrohalogenating the compound of formula 3 to obtain a 7-alkoxy-3,7-dimethyl-2,5-dien-1-ol derivative of formula 4 where R is as stated above; and

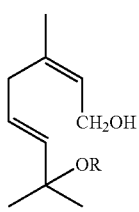

(iii) converting the octadienol of formula 4 to produce racemic nerol oxide of formula 1.

In one embodiment of the invention, R is selected from the group consisting of methyl, ethyl, -propyl and n-butyl.

In another embodiment of the invention X is selected from the group consisting of chloro, bromo- and iodo.

In a further embodiment of the invention, the dehydrohalogenation of compound of formula 3 is carried out with a strong base or an alkali;

In yet another embodiment of the invention, the compound of formula 4 is converted into racemic nerol of formula 1 using dilute mineral acid, lewis acid or an acidic resin.

In another embodiment of the invention, the halogenating agent is selected from the group consisting of N-halogenated compounds selected in turn from the group consisting of N-chlorosuccinimide, N-bromosuccinimide and N-iodosuccinimide, 1,3-dibromo-5,5-dimethylhydantoin (DDH), halogen selected in turn from bromine and iodine, and halogenated salt selected in turn from iodine monochloride and potassium iodate.

In another embodiment of the invention, the solvent used in haloalkoxylation reaction is an alcoholic solvent selected from the group consisting of methanol, ethanol and propanol, or water or any mixture thereof.

In yet another embodiment of the invention, the haloalkoxylation reaction is effected at a temperature in the range of 0–50° C.

In another embodiment of the invention, the base used for dehydrohalogenation is an inorganic base selected from the group consisting of sodium carbonate, potassium carbonate, lithium carbonate, sodium hydroxide, potassium hydroxide and barium hydroxide.

In another embodiment of the invention, the base used for dehydrohalogenation is an organic base selected from the group consisting of diethyl amine, triethyl amine, 1,8-diaza[5,4,0] undec-7-en (DBU), pyridine and collidine.

In another embodiment of the invention, dehydrohalogenation in step (ii) is carried out in the presence of a solvent selected from non-polar and polar solvents.

In another embodiment of the invention, the solvent is selected from the group consisting of hexane, toluene, dioxane, dimethoxy ethane, methanol, ethanol, dimethyl formamide, water and any mixture thereof.

In another embodiment of the invention, dehydrohalogenation is effected at ambient to reflux temperature of the solvent used.

In another embodiment of the invention, cyclisation of the intermediate octadienol of formula 4 to produce racemic nerol oxide is effected in the presence of an organic solvent, an aqueous solvent or an aqueous alcoholic solvent.

In another embodiment of the invention, the dehydrohalogenation is effected at a temperature in the range of 0–20° C.

In another embodiment of the invention the mineral acid is dilute sulphuric acid.

In another embodiment of the invention step (iii) is carried out at a temperature in the range of 0–50° C. preferably 0–15° C.

DETAILED DESCRIPTION OF THE INVENTION

The present invention provides a novel process for the preparation of racemic nerol oxide of formula (1) above from a monoterpene nerol of formula (2) above. The process comprises addition of halogenating reagent in presence of an alcohol to the monoterpene nerol of formula 2 to produce 7-alkoxy-3,7-dimethy-6-halo-2-octenol of formula 3 where R represents an alkyl group and X represents a halogen. The halogenated product is subsequently dehydrohalogenated using a strong base or an alkali to give 7-alkoxy-3,7-dimethyl-octa-2,5-dien-1-ol of formula 4. The compound of the formula 4 is easily cyclised when stirred with an acid or an acidic resin or Lewis acid to produce racemic nerol oxide of formula 1. The halo alkoxylation reaction of monoterpenic alcohol nerol of the formula 2 is preferably effected by N-halogenated succinimide selected from N-chlorosuccinimide, N-bromosuccinimide, N-iodosuccinimide or N, N-dihalogenated dimethyl hydantoin such as 1,3-dibromo-5,5-dimethyl hydantoin (DDH) or a halogen or halogenated salts such as bromine, iodine, iodine monochloride, potassium iodate and the like but more preferably 1,3-dibromo-5,5-dimethyl hydantoin (DDH) in a polar anhydrous alcoholic solvent such as methanol, ethanol, propanol and the like but more preferably methanol. The cohalogenation is effected at a temperature at 0–50° C., more preferably at 0–20° C. The base used for dehydrohalogenation of the halogenated product of formula 3 is preferably selected from inorganic bases such as sodium hydroxide, potassium hydroxide or barium hydroxide, sodium carbonate and the like or it may be selected from the organic bases such as diethyl amine, triethyl amine, 1,8-diazabicyclo [5,4,0]-undec-7-en (DBU), pyridine, collidine and the like but more preferably an inorganic base to produce 7-alkoxy-3,7-dimethyl-octa-2,5-dien-1-ol of formula 4. Dehydrohalogenation reaction is effected in a polar or medium polar solvents such as water, ethanol, methanol, dioxane, dimethoxy ethane and the like or the mixture thereof at ambient to reflux temperature of the solvent. Cyclisation of compound of formula 4 is effected using acidic reagents such as an acidic resin or dilute mineral acid and the like or a Lewis acid, more preferably a dilute mineral acid such as sulphuric acid in an organic solvent or aqueous or aqueous alcoholic solution at a temperature 0–50° C. preferably 0–15° C.

The invention is described with reference to examples given below. These examples should not be construed as to restrict the scope of reaction.

EXAMPLE 1

Step-1; Preparation of 6-bromo-3,7-dimethyl-7-methoxy-2-octenol of formula 3, where R=$CH_3$ and X=Br Commercial nerol (50.0 g, 0.324 mol, 95% purity) is dissolved in anhydrous methanol (150 mL) in a flask fitted with a thermometer, a dropping funnel and a nitrogen inlet. 1,3-Dibromo-5,5-dimethylhydantoin (DDH) (50.0 g, 0.174 mol) is added slowly in small proportions with vigorous stirring at a temperature of 10° C. in nitrogen atmosphere. The temperature during the addition of DDH is maintained between 10–15° C. After the complete addition of DDH the reaction mixture is further stirred for one hr. On completion of the reaction, the mixture is poured in cold water in a separating funnel and extracted with ethyl acetate (3×50 mL). The combined layer of the solvent is washed with 5% sodium carbonate solution (3×25 mL) and then with water (3×30 mL) to neutral pH. Finally the solvent layer is dried over anhydrous sodium sulphate and concentrated on a thin film evaporator at reduced pressure to give colourless oil which is identified as 6-bromo-3,7-dimethyl-7-methoxy-2-octenol of formula 3 (73.12 g, 85.32%) identified by spectral data.

$^1$HNMR CDCl$_3$, δ: 1.27 & 1.32 (6H, 2xS, 2xCH$_3$), 1.74 (3H, S, CH$_3$), 3.23 (3H, S, OCH$_3$), 3.89(2H, d, J=11.6 Hz, CHBr), 4.19(2H, d, J=7 Hz; CH$_2$OH), 5.51(1H, t, J=6 Hz, =CH).

$^{13}$CNMR, CDCl$_3$, δ: 20.89, 22.86, 23.09, 29.83, 31.03, 49.22, 58.42, 62.84, 76.09, 125.58, 137.29.

MS:M$^+$ at m/z 264, 266.

Step-2: Preparation of 3,7dimethyl-7-methoxy-octa-2,5-dien-1-ol of formula 4, where R=CH$_3$.

Crude 6-bromo-3,7-dimethyl-7-methoxy-2-octenol (70.0 g, 0.265 mol.) of formula 3 is dissolved in methanol (200 ml) containing potassium hydroxide (35.0 g) and reaction mixture refluxed at 65–70° C. on a water bath for five hours. After the reaction is complete as monitored by TLC,/GLC, the excess solvent is removed by distillation at reduced pressure bringing the total volume to one fourth. The reaction contents are then poured in cold water in a separating funnel and extracted with chloroform (4×50 ml). The solvent layer is washed with water (3×50 ml) to neutral pH. Finally chloroform layer is dried over anhydrous sodium sulphate and concentrated under reduced pressure to produce a pale yellow oily substance which is identified as 3,7-dimethyl-7-methoxy-octa-2,5-dien-1-ol of formula 4 (43.69 g, 89.56%) from its spectral data.

$^1$HNMR CDCl$_3$, δ: 1.25 (6H, 2xS, 2xCH$_3$), 1.73 (3H, S, CH$_3$), 3.14 (3H, S, OCH$_3$), 4.14 (2H, d, J=7 Hz, CH$_2$OH), 5.47–5.55 (3H, m, =CH).

$^{13}$CNMR, CDCl$_3$, δ: 23.0, 25.25, 25.44, 34.60, 49.70, 58.34, 74.37, 124.67, 126.79, 136.16, 136.84.

MS: M$^+$ at m/z 184.

Step-3: Preparation of (±)-nerol oxides of formula 1

The compound 3.7-dimethyl-7-methoxy-octa-2,5-dien-1-ol of formula 4 prepared in step 2 above (40.0 g, 0.217 mol) was dissolved in n-hexane (100 ml) in a round bottom flask and to this added hydrochloric acid (5%, 15 mL) at 0° C. and stirred the mire for 2 hours.

After the reaction is complete, the solvent layer was separated and washed with 5% sodium bicarbonate solution (3×20 ml) and then with water (3×30 ml) to neutral pH. Finally the solvent layer is dried over anhydrous sodium sulphate and concentrated under vacuo and finally distilled at reduced pressure to give a colour less oil with specific pungent green and rosacious odour of of racemic nerol oxide of formula 1 (29.47 g, 89.30%) that is also confirmed by spectral analysis.

$^1$HNMR, CDCl$_3$, δ: 1.69 (6H, 2xS, 2xCH$_3$), 1.74 (3H, S, CH$_3$), 4.23 (3H, m, CH$_2$OH & CHOH), 5.22 (1H, d, J=7 Hz, =CH), 5.41 (1H, m, =CH).

$^{13}$CNMR, CDCl$_3$, δ: 19.60, 23.90. 26.98, 37.19, 66.79, 71.92, 120.92, 126.94, 133.08, 137.28.

MS:M$^+$ at m/z 152.

EXAMPLE 2

Step-1: Preparation of 6-bromo-3,7-dimethyl-7-etboxy-2-octenol of formula 3, where R=C$_2$H$_5$ and X=Br N-bromosuccinimide (60.0 g, 0.337 mol) dissolved in anhydrous ethanol (150 mL) is placed in a flask fitted with a therrmometer, a dropping funnel and a nitrogen inlet. Commercial nerol (50.0 g, 0.324 mol, 95% purirty) is taken in the dropping funnel and added slowly with vigorous stirring at a temperature of 5–20° C. in nitrogen atmosphere. The temperature during the addition of nerol is maintained between 10–20° C. After the completion of reaction, the reaction mixture is poured in cold water in a separating funnel and exacted with n-hexane (3×100 mL). The n-hexane extract is washed with 5% sodium carbonate solution (3×25 mL) and then with water to neutral pH. The solvent layer is finally dried over anhydrous sodium sulphate and removed under reduced pressure to give a pale yellow oil identified as 6-bromo-3,7-dimethyl-7-ethoxy-2-octenol of formula 3 (76.63 g 84.95%).

Step-2: Preparation of 3,7-dimethyl-7-ethoxy-octa-2,5dien-1-ol of formula 4 where R=C$_2$H$_5$.

Crude 6-bromo-3,7-dimethyl-7-ethoxy-2octenol of the formula 3 (70.0 g, 0.251 mol) obtained from step 1 above is dissolved in ethanol (200 mL) in a flask fitted with a condenser. Sodium hydroxide (30.0 gm) is added in the flask and the contents refluxed for 10 hours. After the reaction is complete, solvent is removed by distillation at reduced pressure to bring the total volume to one fourth. The reaction mixture is poured in cold water (200 ml) then extracted with ethyl acetate (3×100 mL). The solvent layer is washed with water to neutral pH. The solvent is finally dried over sodium sulphate and removed under vacuo to give a colourless oil identified as 3,7-dimethyl-7-ethoxy-octa-2,5-dien-1-ol of formula 4 (44.76 g, 89.78%) by spectral studies.

Step-3: Preparation of racemic nerol oxide of formula 1

The compound 3,7-dimethyl-7-ethoxy-octa-2,5-dien-1-ol of formula 4, (40.0 g, 0.20 mol) obtained from step 2 above without purification was dissolved in acetone (100 mL) in a round bottom flask. The resin amberlite plus 120 (15.0 gms) is added in the flask and the reaction mixture is stirred at a temperature 10° C. for 2 hours. After the completion of the reaction as monitored by TLC, the resin is removed by filtration and the solvent layer is distilled under vacuo to produce the crude nerol oxide which thus obtained is purified by steam distillation to furnish pure nerol oxide of formula 1 (27.30 g, 88.98%) and its identity confirmed by spectal studies.

Advantages:

The advantages of the process are as under:
1. The process is novel, and facile and requiring only a three step reaction sequence using monoterpenic alcohol nerol as the starting material.
2. The process is high yielding and yield in each step is betwreen 80–90%.
3. The over all yield of the fumal product i.e. nerol oxide is 55–65%.
4. The reagents used are commercially available, cheap and after recovery may be reutilized after reconversion to the corresponding halo derivatives.
5. The process can be easily up scaled for commercial production.

We claim:

1. A process for the preparation of racemic nerol oxide of formula 1 from monoterpene nerol of formula 2, the process comprising:

1

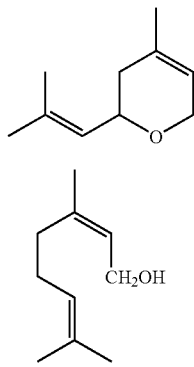

2

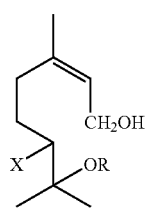

(i) haloalkoxylating monoterpene nerol of formula 2 with a halogenating agent and in a solvent to produce 7-alkoxy-3,7-dimethyl-6-halo-2-octenol of formula 3 where R is alkyl and X is halo;

3

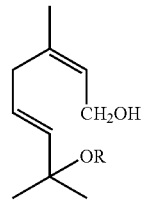

(ii) dehydrohalogenating the compound of formula 3 to obtain a 7-alkoxy-3,7-dimethyl-octa-2,5-dien-1-ol derivative of formula 4 where R is as stated above; and

4

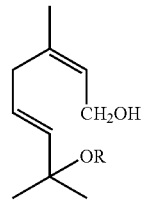

(iii) converting the octadienol of formula 4 to produce racemic nerol oxide of formula 1.

2. A process as claimed in claim 1 wherein R is selected from the group cosisting of methyl, ethyl, n-propel and n-butyl.

3. A process as claimed in claim 1 wherein X is selected from the group consisting of chloro, bromo- and iodo.

4. A process as claimed in claim 1 wherein the dehydrohalogenation of compound of formula 3 is carried out with a strong base or an alkali.

5. A process as claimed in claim 1 wherein the compound of formula 4 is converted into racemic nerol of formula 1 using dilute mineral acid, lewis acid or an acidic resin.

6. A process as claimed in claim 1 wherein the halogenating agent is selected from the group consisting of N-halogenated compounds selected in turn from the group consisting of N-chlorosuccinimide, N-bromosuccinimide and N-iodosuccinimide, 1,3-dibromo-5,5-dimethylhydantoin (DDH), halogen selected in turn from bromine and iodine, and halogenated salt selected in turn from iodine monochloride and potassium iodate.

7. A process as claimed in claim 1 wherein the solvent used in haloalkoxylation reaction is an alcoholic solvent selected from the group consisting of methanol, ethanol and propanol, or water or any mixture thereof.

8. A process as claimed in claim 1 wherein the haloalkoxylation reaction is effected at a temperature in the range of 0–50° C.

9. A process as claimed in claim 1 wherein the base used for dehydrohalogenation is an inorganic base selected from the group consisting of sodium carbonate, potassium carbonate, lithium carbonate, sodium hydroxide, potassium hydroxide and barium hydroxide.

10. A process as claimed in claim 1 wherein the base used for dehydrohalogenation is an organic base selected from the group consisting of diethyl amine, triethyl amine, 1,8-diaza [5,4,0]undec-7-en (DBU), pyridine and collidine.

11. A process as claimed in claim 1 wherein dehydrohalogenation in step (ii) is carried out in the presence of a solvent selected from non-polar and polar solvents.

12. A process as claimed in claim 11 wherein the solvent is selected from the group consisting of hexane, toluene, dioxane, dimethoxy ethane, methanol, ethanol, dimethyl formamide, water and any mixture thereof.

13. A process as claimed in claim 1 wherein dehydrohalogenation is effected at ambient to reflux temperature of the solvent used.

14. A process as claimed in claim 1 wherein cyclisation of the intermediate octadienol of formula 4 to produce racemic nerol oxide is effected in the presence of an organic solvent, an aqueous solvent or an aqueous alcoholic solvent.

15. A process as claimed in claim 1 wherein the hydrohalogenation is effected at a temperature in the range of 0–20° C.

16. A process as claimed in claim 5 wherein the mineral acid is dilute sulphuric acid.

17. A process as claimed in claim 1 wherein step (iii) is carried out at a temperature in the range of 0–50° C.

18. A process as claimed in claim 1 wherein step (iii) is carried out at a temperature in the range of 0–15° C.

* * * * *